United States Patent [19]

Alder

[11] Patent Number: 5,840,419
[45] Date of Patent: Nov. 24, 1998

[54] POLYMERIC FILMS

[75] Inventor: Paul Thomas Alder, Swindon, England

[73] Assignee: Hoechst Trespaphan GmbH, Germany

[21] Appl. No.: 696,843

[22] PCT Filed: Jan. 9, 1996

[86] PCT No.: PCT/GB96/00024

§ 371 Date: Aug. 28, 1996

§ 102(e) Date: Aug. 28, 1996

[87] PCT Pub. No.: WO96/21567

PCT Pub. Date: Jul. 18, 1996

[30] Foreign Application Priority Data

Jan. 11, 1995 [GB] United Kingdom .................... 9500466
Nov. 27, 1995 [GB] United Kingdom .................... 9524199

[51] Int. Cl.$^6$ ....................................................... B32B 5/16
[52] U.S. Cl. ........................... 428/327; 428/323; 428/402; 428/411.1; 428/447; 428/500; 428/515; 428/516; 428/304.4; 428/321.1; 428/35.7
[58] Field of Search ................................. 428/411.1, 405, 428/688, 500, 402, 327, 323, 304.4, 321.1, 447, 515, 516, 35.7

[56] References Cited

U.S. PATENT DOCUMENTS

| | | | |
|---|---|---|---|
| 4,595,625 | 6/1986 | Crass et al. | 428/215 |
| 4,966,933 | 10/1990 | Kawakami et al. | 524/310 |
| 4,983,447 | 1/1991 | Crass et al. | 428/216 |
| 5,691,043 | 11/1997 | Keller et al. | 428/212 |

FOREIGN PATENT DOCUMENTS

| | | |
|---|---|---|
| 0 454 420 | 10/1991 | European Pat. Off. . |
| 2 280 403 | 2/1995 | United Kingdom . |
| WO 95 15256 | 6/1995 | WIPO . |

*Primary Examiner*—Marie Yamnitzky
*Attorney, Agent, or Firm*—Bacon & Thomas

[57] ABSTRACT

Multilayer polyolefin film having a core layer of a propylene polymer and an outer polyolefin layer on the core layer, the outer polyolefin layer including a coefficient of friction reducing amount of a particulate, partially cross-linked, polysiloxane. Non-cross-linked polysiloxane in the particulate polysiloxane is released when the particles are subjected to mechanical stress which causes the slip of the films to increase as they are placed under increasing mechanical stress.

10 Claims, No Drawings

POLYMERIC FILMS

BACKGROUND OF THE INVENTION

1. Field of the Invention

This invention concerns polymeric films having good slip properties.

2. Description of Related Art

Many proposals have been made hitherto for improving the slip properties of polymeric films, and those of polyolefin films in particular. In the case of polypropylene based films, for example, it has been proposed to incorporate migratory slip additives such as fatty acid amides into the films so that with time the slip additive migrates to the surface of the film, thereby improving the slip properties of the film.

One problem encountered with migratory slip additives is that the slip properties of films containing them tend to increase with time, due to progressively more of the slip additive accumulating on the film surface. Such increases in slip properties can cause the film to have poor performance when used in high speed packaging machinery because the films have become too slippery. In addition, accumulating migratory slip additive on the film surface tends to reduce the optical characteristics of the films, for example leading to increased haze and reduced gloss.

As an alternative to the use of migratory slip additives, it has been proposed to use silicone oil as a slip agent, the silicone oil either being compounded into an outer layer or layers of the films or coated onto at least one surface of the films. Silicone oil is apparently essentially non-migratory since the slip properties of films including it in compounded form remain substantially constant with time, that is, silicone oil within the film apparently remains there and the slip properties of the films are a function of the amount of silicone at or on the surface of the film when it is made. However, silicone on one surface of a film has been found to transfer to the opposite surface of the film when the film is wound up, whether or not the silicone present on that surface has been put there by compounding or by coating. Thus when silicone oil is used as a slip agent, it need only be coated on or compounded with one surface of the film since transfer in the roll causes silicone to become present on both film surfaces.

Although the use of silicone oil as a slip agent for polyolefin films has advantages over the use of migratory slip additives such as fatty acid amides, it does have disadvantages. One major disadvantage is that treatments of the surfaces of films to increase their surface energy, for example with the objective of increasing the printability of the films, have not been possible with film surfaces having silicone compounded into or coated on them since other properties of the films, for example heat sealability, can be adversely affected. However, it is possible to increase the printability of such films if the surface which is treated, for example by flame or corona discharge treatment, does not include compounded silicone oil and does not have a surface coating of silicone oil thereon at the time of the treatment. Silicone oil on the other surface of the film, whether there as a result of coating or compounding, can then transfer to the treated surface of the film when the film is in the roll, and at least some of the benefits of the surface treatment remain without the loss of properties which would have resulted if the silicone oil had been present at the time of the treatment.

Despite this ability to avoid the problems with treating film surfaces having a surface layer of silicone oil, by transferring silicone oil to the surface after treatment rather than before, there are problems with such films, notably in that the amount of silicone oil transferred from the surface of a film in which the silicone oil is compounded is often insufficient to provide the surface to which it is transferred with desired levels of slip. Coating a film surface with silicone oil followed by transfer to the treated surface in the roll can reduce this problem, but the amount of silicone oil which has to be coated onto the film for this to occur tends to be sufficiently high that the effect of transferred silicone oil on the printability of the treated film surface can be unpredictable. For example, the surface which has been treated to increase its surface energy can be more or less receptive to printing inks with the result that poor print quality results.

SUMMARY OF THE INVENTION

According to the present invention there is provided multilayer polyolefin film comprising a core layer of a propylene polymer and an outer polyolefin layer on the core layer, the outer polyolefin layer including a coefficient of friction reducing amount of a particulate, partially cross-linked, polysiloxane.

The partially cross-linked polysiloxane is preferably a polydialkylsiloxane, polydimethylsiloxanes being particularly preferred. It is particularly preferred to use partially cross-linked polysiloxanes which are in the form of elastomeric particles including polysiloxane in the form of silicone oil.

DETAILED DESCRIPTION OF THE INVENTION

Films in accordance with the present invention have shown good slip properties for the surface including the cross-linked polydialkylsiloxane. In particular, the non-cross-linked polydialkylsiloxane in the particles of partially cross-linked polydialkylsiloxane is apparently free to be released from the particles when the particles are subjected to mechanical stress. The result is a film having a degree of slip which can be increased as the film itself is subjected to increased mechanical stress.

Films in accordance with the present invention have also been subjected to a treatment to increase the surface energy of the outer layer containing the cross-linked polysiloxane, without resulting in the adverse effects encountered with hitherto proposed films having compounded silicone oil in the treated surface or a coating of silicone oil thereon. It is therefore possible in accordance with the present invention to have a core layer with an outer polyolefin layer on either side of the core layer, each outer layer including a coefficient of friction reducing amount of a particulate, partially cross-linked polysiloxane.

The degree of cross-linking of the polysiloxane can be varied according to the properties required for the films, but excessively high degrees of cross-linking will result in insufficient free or non-cross-linked polysiloxane being available to impart desired degrees of slip. However, low degrees of cross-linking can result in an inability to form particles, and therefore an inability to hold free polysiloxane in the form of silicone oil in the particles, for example before mechanical stress releases it. The latter could result in treatment of the layer containing the partially cross-linked polysiloxane to increase its surface energy, e.g. by corona discharge treatment or flame treatment, having the undesirable effects associated hitherto with treating surfaces having a layer of silicone oil thereon.

It is generally preferred to use cross-linked silicones including up to 60 or possibly 70% by weight of free silicone oil, the lower limit usually being determined by the ability to release silicone oil in amounts sufficient to affect the slip properties of the films. As will also be appreciated, the viscosity of the free silicone oil will also have an effect on the slip characteristics of the films.

It is generally preferred that the particles of the polysiloxane have a mean particle size of not more than 6 $\mu$m. However, it is generally preferred that the particles have a mean particle size of at least 0.5 $\mu$m, and preferably at least 2 $\mu$m. The use of partially cross-linked polysiloxane particles of such mean particle size can also serve to provide films of the present invention with antiblock properties, thereby enabling slip and antiblock properties to be provided by a single additive.

The amount of partially cross-linked polysiloxane present in the outer layer can be varied according to the degree of slip which it is desired to impart to the films. However, it is usually preferred that the outer layer includes at least 1000 ppm of the partially cross-linked polysiloxane, although amounts in excess of 5000 ppm are not usually necessary in order to achieve desired slip properties.

Although films in accordance with the present invention can have only one outer layer including a particulate, partially cross-linked polysiloxane, it is generally preferred that both outer layers include such a polysiloxane.

In addition to the cross-linked silicone, it is generally preferred to include at least one antiblock agent in the outer polymeric layer. The antiblock agent can be organic, for example a polyamide or a polyester, or inorganic, for example silica, talc, barium sulfate or zinc sulfide, the preferred antiblock agent being silica.

The amount of antiblock agent in the outer polymeric layer containing the cross-linked silicone is preferably at least 500 ppm, based on the weight of the layer, and preferably not more than 5000 ppm. The antiblock agent preferably has a mean particle size of from 1 to 6 $\mu$m.

The slip characteristics of films of the present invention can, if desired, be modified by the inclusion of one or more migratory additives in the core layer. Suitable additives for the purpose are known in the art, glyceryl mono-esters of fatty acids, for example glyceryl mono-stearate and glyceryl mono-behenate being preferred. It is generally preferred to use at least 1000 ppm of a glyceryl mono-ester of a fatty acid, based on the weight of the core layer, but amounts in excess of 6000 ppm are generally not preferred since more of such additives usually does not contribute a proportionate increase in slip properties, whilst it usually does reduce the optical properties of the films, for example by increasing their haze.

Films of the present invention can include at least one antistatic agent, for example such as are known in the art for use in polypropylene films. Preferred antistatic agents for use in films of the present invention are bis-alkoxylated derivatives of long chain amines, a particularly preferred antistatic agent being bis-(2-hydroxyethyl)-tallow amine.

As will be appreciated by those skilled in the art, it is generally preferred not to use a migratory additive when films of the present invention are to be metallized on a surface other than the specified polymeric layer containing the cross-linked silicone. However, if such additives are used in the core layer of films which are to be metallized, it is preferable that they should not be present in amount which significantly adversely affect adhesion of vacuum deposited metal layers.

The core layer of films in accordance with the present invention is of a propylene polymer, and preferably of a propylene homopolymer.

The polyolefin forming the outer layer is preferably a copolymer containing units derived from two or more alkenes, for example from ethylene, propylene or butene-1, or a mixture of two or more such copolymers. The outer layer is preferably of a heat-sealable polymer or polymer blend.

In addition to the core layer and the outer polyolefin layer containing the particulate, partially cross-linked polysiloxane, with or without a further outer polyolefin layer containing such a polysiloxane, films in accordance with the present invention can include one or more intermediate layer between the core layer and the outer layer(s). Any or all of the layers can, if desired, include additives and/or fillers known in the art for use in polyolefin films. However, as will be appreciated, it is generally preferred that the outer layer (s) containing the cross-linked polysiloxane should be free of separately compounded silicone oil and should not have a coating of silicone oil applied thereto except as might result from free polysiloxane in the cross-linked particles.

Films in accordance with the present invention can, therefore, be pigmented, include at least one layer in which are present micro-voids, or include a layer of a material which imparts barrier properties to the films.

At least one surface of films in accordance with the present invention is preferably treated to increase its surface energy, for example by flame or corona discharge treatment, and this can be the surface of an outer layer containing the particulate, partially cross-linked polysiloxane. However, such treatments of the surface including the cross-linked silicone can have a detrimental effect on the slip properties of films of the present invention, but the presence of a migratory slip additive in the core layer can serve to reduce such detrimental effects. Furthermore, transfer of silicone from the other surface of the film to the treated surface can also serve to reduce this detrimental effect if such is present on the other surface of the film in an amount such that significant transfer can take place.

Films in accordance with the present invention can be produced by known methods, for example by coextrusion of melts of the appropriate polymers for the respective layers, plus the desired additives, to form a polymer web. It is particularly preferred to form the melts using master batches of the various additives, the cross-linked silicone preferably being added as a master batch of up to 7 wt % of the silicone in a polymer to be used in the outer layer. The polymer web can then be formed into films of the present invention using known techniques, for example by biaxial stretching of the web, either simultaneously using the bubble process or sequentially using heated rollers in the direction of extrusion or followed by transverse stretching using a stenter oven.

The following Example is given by way of illustration only.

EXAMPLE 1

A three layer polymeric film was produced by initially coextruding a polymer web consisting of a core layer of propylene homopolymer containing 1000 ppm of bis-ethoxylated amine with outer layers of a propylene/ethylene copolymer (6 wt % ethylene) containing 0.25 wt % of particulate, partially cross-linked polydimethylsiloxane (BY29-110—ex Toray Silicones, particle size in the range of 2–5 $\mu$m) on either surface of the core layer. The coextruded web was cooled on a chill roll and then stretched 4.5 times in the direction of extrusion by passing it over heated rollers with differing peripheral speeds, and thereafter 9 times in the transverse direction using a stenter oven.

The resulting film was cooled, one side was subjected to corona discharge treatment to increase its surface energy to 42 dynes, and the film was wound up.

The film had an overall thickness of 30 µm, each outer layer being 0.8 µm thick.

The static and dynamic slip properties of the film were then measured, dynamic coefficient of friction (COF) being measured using a Davenport slip tester with a 700 g sled at 80 cm/min, the film being anchored to the base plate using double sided tape.

As can be seen from Table 1, the dynamic coefficient of friction is significantly lower than the static coefficient of friction for the same type of surface-to-surface contact. The difference between the static and dynamic values of coefficient of friction is such as to indicate that free polydialkylsiloxane in the cross-linked particles is being released from the particles to give a positive contribution to the measured dynamic coefficient of friction.

The corona treated surface of the film was both heat sealable and printable. An analogous film including compounded silicone oil was corona discharge treated, and the treated surface showed very low print adhesion.

EXAMPLE 2

A three layer film was produced by the method described in Example 1 except that the two outer layers each contained 0.25 wt % of the cross-linked polydimethylsiloxane plus 1000 ppm of a synthetic silica with a mean particle size of 2 µm.

The film had a haze value of 1.0, and the measurements of its coefficient of friction are given in Table 1.

EXAMPLE 3

A three layer film was produced by the method described in Example 1 except that the two outer layers each contained 0.5 wt % of the cross-linked polydimethylsiloxane plus 1000 ppm of a synthetic silica with a mean particle size of 2 µm. In addition, the core layer contained 0.11 wt % of glyceryl mono-stearate.

The film had a haze value of 0.9, and the measurements of its coefficient of friction are given in Table 1.

TABLE 2

| | Coefficient of Friction | | | |
| | Treated/Treated | | Untreated/Untreated | |
| Example | Static | Dynamic | Static | Dynamic |
| --- | --- | --- | --- | --- |
| 1 | 0.44 | 0.25 | 0.56 | 0.24 |
| 2 | 0.32 | 0.27 | 0.35 | 0.24 |
| 3 | 0.43 | 0.31 | 0.39 | 0.27 |

I claim:

1. Multilayer polyolefin film comprising a core layer of a propylene polymer and an outer polyolefin layer on the core layer, the outer polyolefin layer including a coefficient of friction reducing amount of elastomeric particles of partially cross-linked, polysiloxane containing non-crosslinked polysiloxane in the form of silicone oil in an amount up to 70% by weight, such that the siliconeoil is free to be released from the particles when the particles are subjected to mechanical stress to affect the slip properties of the film.

2. Film according to claim 1, wherein the partially cross-linked polysiloxane is a polydialkylsiloxane.

3. Film according to claim 2, wherein the partially cross-linked polydialkysiloxane is a polydimethylsiloxane.

4. Film according to claim 1, wherein the elastomeric particles have a mean particle size of not more than 6 µm.

5. Film according to claim 1, wherein the elastomeric particles are present in an amount of up to 0.5 wt % of the said outer layer.

6. Film according to claim 1, wherein the elastomeric particles include up to 60 wt % of the non-crosslinked polysiloxane.

7. Film according to claim 1, wherein an outer polyolefin layer including a coefficient of friction reducing amount of said elastomeric particles is present on both sides of the core layer.

8. Film according to claim 1, wherein at least one surface thereof has been treated to increase its surface energy.

9. Film according to claim 1, wherein said outer polyolefin layer further includes at least one antiblock agent.

10. Film according to claim 9, wherein said antiblock agent is present in an amount from 500 ppm to 5000 ppm and has a mean particle size from 1 to 6 µm.

* * * * *